(12) United States Patent
Lin

(10) Patent No.: US 9,537,406 B1
(45) Date of Patent: Jan. 3, 2017

(54) FLYBACK CONTROLLER FEATURING BIDIRECTIONAL POWER CONTROL AND PARALLELLY-CONNECTED POWER MODULES

(71) Applicant: CHYNG HONG ELECTRONIC CO., LTD., Taichung (TW)

(72) Inventor: Mu-Chun Lin, Taichung (TW)

(73) Assignee: CHYNG HONG ELECTRONICS CO., LTD., Taichung (TW)

( * ) Notice: Subject to any disclaimer, the term of this patent is extended or adjusted under 35 U.S.C. 154(b) by 28 days.

(21) Appl. No.: 14/793,430

(22) Filed: Jul. 7, 2015

(51) Int. Cl.
H02M 3/335 (2006.01)

(52) U.S. Cl.
CPC .................. *H02M 3/33507* (2013.01)

(58) Field of Classification Search
CPC ............... H02M 3/33507; H02M 3/33515; H02M 3/285; H02M 3/1584; H02M 1/088; H02M 7/153; H02M 7/08; H02M 7/17
USPC .................. 363/21.12, 21.13, 65, 67, 69, 71
See application file for complete search history.

(56) References Cited

U.S. PATENT DOCUMENTS

| | | | | |
|---|---|---|---|---|
| 4,736,286 A * | 4/1988 | Gulczynski | ............ | H02M 1/44 363/15 |
| 4,803,610 A * | 2/1989 | Gulczynski | ............ | H02M 3/10 363/45 |
| 5,267,136 A * | 11/1993 | Suga | ........................ | G05F 1/563 307/6 |
| 5,508,903 A * | 4/1996 | Alexndrov | ........ | H02M 3/33569 363/16 |
| 6,031,747 A * | 2/2000 | Ilic | ........................ | H02M 3/285 363/21.12 |
| 7,986,535 B2 * | 7/2011 | Jacobson | ................ | H02M 1/34 363/17 |
| 2012/0043923 A1 * | 2/2012 | Ikriannikov | .............. | H02J 1/10 320/103 |
| 2013/0201733 A1 * | 8/2013 | Divan | ..................... | H02M 1/00 363/39 |
| 2013/0241433 A1 * | 9/2013 | Ge | ..................... | H05B 33/0815 315/224 |
| 2015/0372622 A1 * | 12/2015 | Ortiz | ........................ | H02P 3/14 318/376 |
| 2016/0072398 A1 * | 3/2016 | Deboy | .............. | H02M 3/33592 363/21.1 |
| 2016/0204707 A1 * | 7/2016 | Takahara | ............ | H02M 1/4258 363/16 |
| 2016/0211750 A1 * | 7/2016 | Coleman | ................ | H02M 1/15 |

\* cited by examiner

*Primary Examiner* — Adolf Berhane
(74) *Attorney, Agent, or Firm* — Ming Chow; Sinorica, LLC

(57) ABSTRACT

A flyback controller featuring bidirectional power control and parallelly-connected power modules is based on flyback DC-DC converters for allowing bidirectional energy flow and transformation. The flyback controller includes two bidirectional DC-DC converters that are connected in parallel. The bidirectional DC-DC converters are electrically connected with a digital-signal processor. The digital-signal processor controls the bidirectional DC-DC converters and current thereof, so that the current flows evenly across the bidirectional DC-DC converters. Thereby, the flyback controller has advantages about simplified components and increased power output, and is suitable for testing secondary batteries.

6 Claims, 5 Drawing Sheets

FLYBACK CONTROLLER FEATURING BIDIRECTIONAL POWER CONTROL AND PARALLELLY-CONNECTED POWER MODULES

BACKGROUND OF THE INVENTION

1. Technical Field

The present invention relates to flyback controllers, and more particularly to a flyback controller featuring bidirectional power control and parallelly-connected power modules.

2. Description of Related Art

High-power-density secondary batteries are of significance for the development of electric vehicles and hybrid vehicles. Generally, vehicle manufacturers have to conduct complex road tests and environmental tests before deciding which battery is a suitable secondary battery, and this process is time-consuming and costly. For reducing the costs required by the tests on secondary batteries, the inventor of the present invention, on the strength of years of experiences in the art, has devised a DC-DC converter system that supports two-way energy flow and uses software to realize a control scheme showing highly dynamic response, so as to meet the needs for testing secondary batteries.

FIG. 1 schematically depicts a conventional bidirectional DC-DC converter. The bidirectional DC-DC converter is based on phase-shifted full-bridge topology. While such a bidirectional DC-DC converter provides a large range of current modulation that is suitable for testing secondary batteries, it comprises at least eight sets of FETs 1, 2, 3, 4, 5, 6, 7, 8 together with other power devices, and the numerous components make the bidirectional DC-DC converter difficult to assemble and expansive to produce. In view of this, the inventor of the present invention makes improvements to the conventional bidirectional DC-DC converters by providing the present invention.

SUMMARY OF THE INVENTION

The primary objective of the present invention is to provide a flyback controller featuring bidirectional power control and parallelly-connected power modules. The disclosed device is based on a flyback controller that uses limited power devices and DC-DC converters allowing bidirectional energy flow and transformation, so as to simplify the components required. Besides, the disclosed device has two power modules connected in parallel with each other, thereby increasing power output and meeting more needs in practical use.

For achieving the foregoing objective, the disclosed flyback controller comprises two bidirectional DC-DC converters that are connected in parallel with each other. Each of the bidirectional DC-DC converters comprises a first capacitor that is connected in series with a first FET (field effect transistor). The first FET is connected in parallel with a first diode. The first FET and the first diode are further connected in series with a first inductor. The first inductor is connected in parallel with a primary side. The first inductor is further connected in series with the first capacitor. Opposite to the primary side there is a secondary side. The secondary side is connected in parallel with a second inductor. The second inductor is connected in series with a second FET. The second FET is connected in parallel with a second diode. The second FET and the second diode are further connected in series with a second capacitor, and the second capacitor is further connected in series with the second inductor.

DETAILED DESCRIPTION OF THE INVENTION

Figure 1:
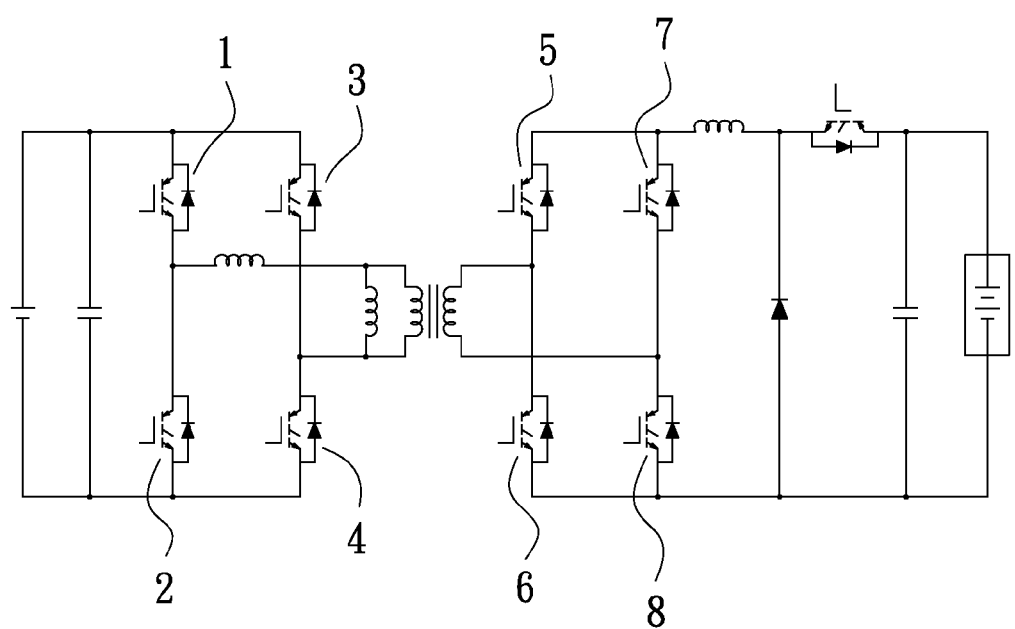
FIG. 1 is a circuitry of a conventional bidirectional DC-DC converter.
Figure 2:
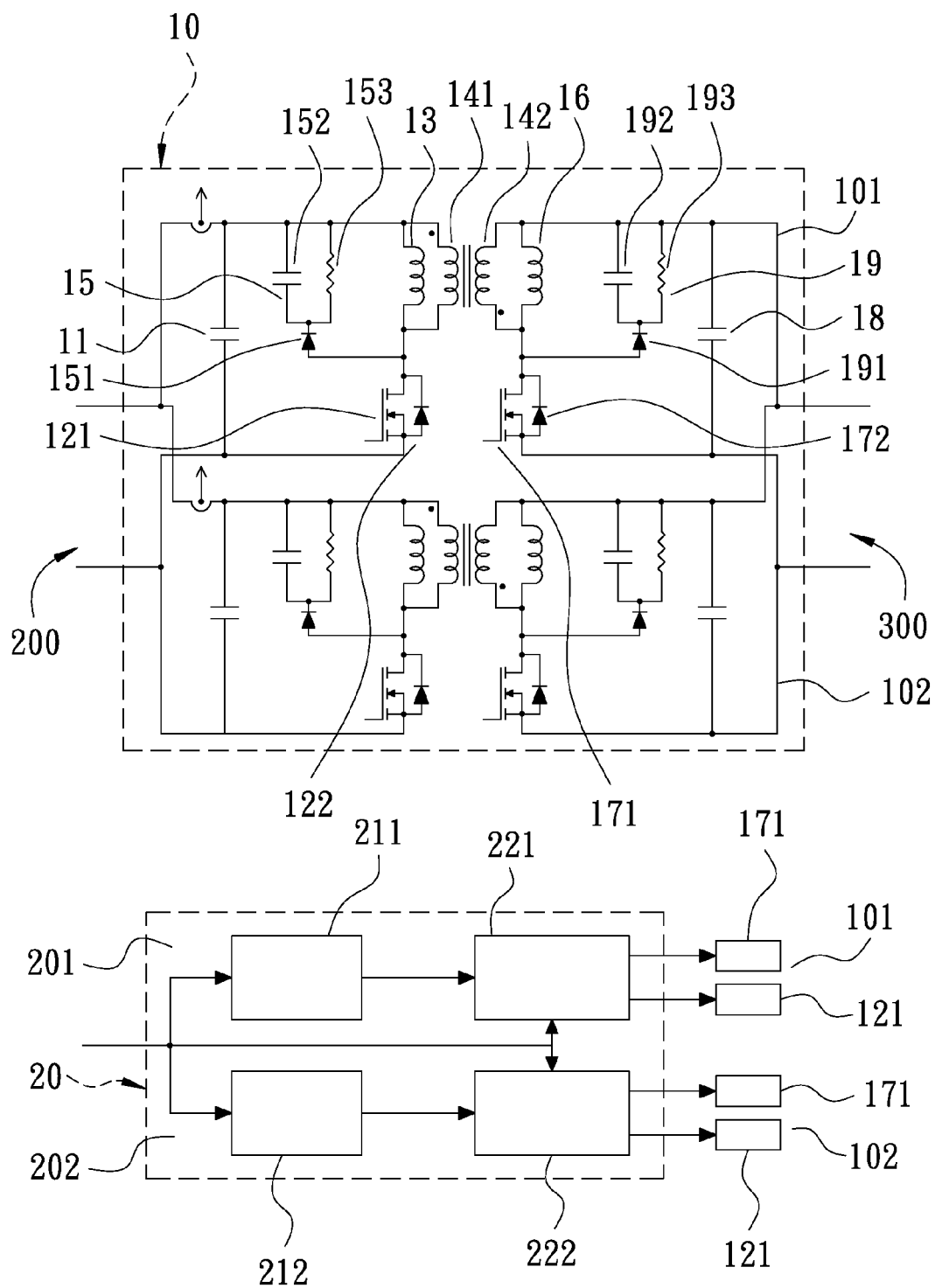
FIG. 2 schematically shows a first embodiment of the present invention.

FIG. 2 schematically shows a first embodiment of the present invention. As shown, a flyback controller featuring bidirectional power control and parallelly-connected power modules is connected in series with a secondary battery 200 and a DC voltage source 300. The flyback controller comprises a bidirectional DC-DC converting module 10 and a digital-signal processor 20.

The bidirectional DC-DC converting module 10 comprises two bidirectional DC-DC converters. The bidirectional DC-DC converters are connected in parallel with each other and defined as a first bidirectional DC-DC converter 101 and a second bidirectional DC-DC converter 102, respectively. Each said bidirectional DC-DC converter comprises a first capacitor 11. The first capacitor 11 is electrically connected with the secondary battery 200, and the first capacitor 11 is further connected in series with a first FET 121. The first FET 121 is connected in parallel with a first diode 122. The first FET 121 and the first diode 122 are further connected in series with a first inductor 13. The first inductor 13 is connected in parallel with a primary side 141. The first inductor 13 is further connected in parallel with a first RCD snubber 15. The first RCD snubber 15 comprises a diode 151. The diode is connected in series with a capacitor 152. The capacitor is connected in parallel with a resister 153. The first inductor 13 is further connected in series with the first capacitor 11, so as to form a loop. Opposite to the primary side 141 there is a secondary side 142, so as to form a high-frequency transformer. Since the high-frequency transformer is a media for transferring and storing energy in the flyback controller, the primary side 141 and the secondary side 142 are preferably cores of high permeability for providing sufficient flux. The secondary side 142 is connected in parallel with a second inductor 16. The second inductor 16 is connected in series with a second FET 171. The second FET 171 is connected in parallel with a second diode 172. The second FET 171 and the second diode 172 are further connected in series with a second capacitor 18. The second capacitor 18 is electrically connected with the DC voltage source 300, and the second capacitor 18 is further connected in series with the second inductor 16, so as to form a loop. The second inductor 16 is further connected in parallel with a second RCD snubber 19. The second RCD snubber 19 comprises a diode 191. The diode is connected in series with a capacitor 192. The capacitor is connected in parallel with a resister 193, thereby reducing voltage surges.

The digital-signal processor 20 is electrically connected with the bidirectional DC-DC converters 101, 102 separately. The digital-signal processor 20 controls the bidirectional DC-DC converters 101, 102 and current thereof, so as to make the current flow evenly across the bidirectional DC-DC converters 101, 102. The digital-signal processor 20 comprises a first control loop 201 and a second control loop 202. The first control loop 201 has one end electrically connected between the first capacitor 11 of the first bidirectional DC-DC converter 101 and the secondary battery 200. The first control loop 201 comprises a first current controller 211. The first current controller 211 is connected in series with a first pulse width modulator (PWM) 221. The first PWM 221 is electrically connected with the first FET 121 and the second FET 171 of the first bidirectional DC-DC converter 101 separately. The second control loop 202 has one end electrically connected between the first capacitor 11 of the second bidirectional DC-DC converter 102 and the secondary battery 200. The second control loop 202 comprises a second current controller 212. The second current controller 212 is connected in series with a second PWM 222. The second PWM 222 is electrically connected with the first FET 121 and the second FET 171 of the second bidirectional DC-DC converter 102 separately. In the present embodiment, the digital-signal processor 20 is composed of current-sensing devices of high accuracy and PWMs of high definition. As compared to a voltage-based sensor, it is less likely to have its feedback readings affected by voltage divisions due to line impedance and has greater bandwidth for increased definition.

The disclosed flyback controller can be operated for bidirectional energy flow and transformation in different modes such as charging and discharging. Since the charging and discharging modes are not in effect at the same time, the two modes are explained in the following description separately.

Figure 3:
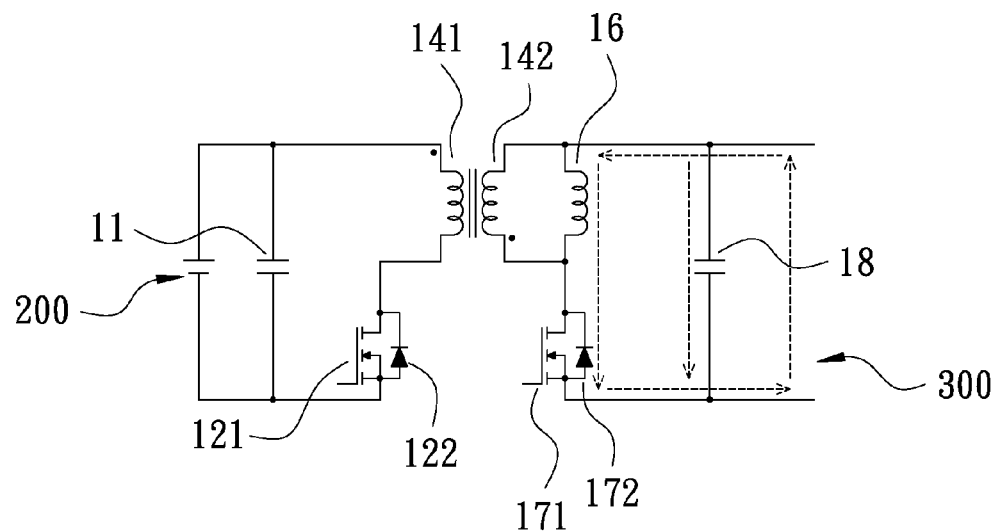
FIG. 3 schematically shows a first charging state of the first embodiment of the present invention.
Figure 4:
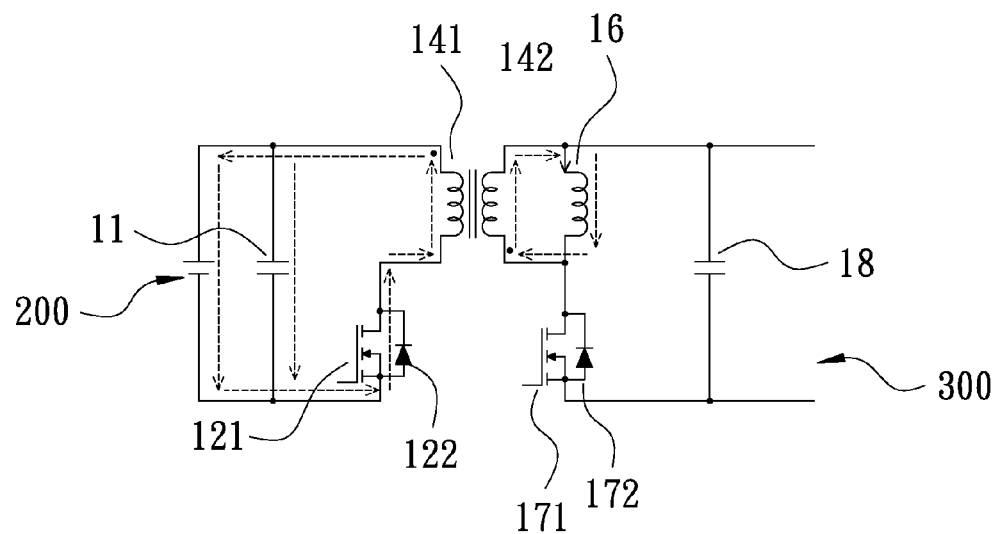
FIG. 4 schematically shows a second charging state of the first embodiment of the present invention.

Referring to FIG. 3 that schematically shows a first charging state of the first embodiment of the present invention together with FIG. 2, when the flyback controller operates in the charging mode, the digital-signal processor 20 first sends out a driving signal to turn the second FET 171 on and turn the first FET 121 off. At this time, the electric current flows through the second FET 171, and magnetizes the second inductor 16 for storing energy. Referring to FIG. 4 that schematically shows a second charging state of the first embodiment of the present invention together with FIG. 2, the digital-signal processor 20 further turns the second FET 171 off, so as to make both the first FET 121 and the second FET 171 off. At this time, the electric current at the second inductor 16 transfers energy to the primary side 141 through the secondary side 142. After transferred to the primary side 141, the energy is returned to the primary side 141 through a back-connected first diode 122 of the first FET 121. Then the digital-signal processor 20 turns the first FET 121 on, and turns the second FET 171 off. At this time, the electric current at the second inductor 16 has the energy transferred to the primary side 141 through the secondary side 142. After transferred to the primary side 141, the energy is returned to the primary side 141 through the first FET 121. The digital-signal processor 20 then turns the first FET 121 off, so that both the first FET 121 and the second FET 171 are off. At this time, the electric current at the second inductor 16 has the energy transferred to the primary side 141 through the secondary side 142. After transferred to the primary side 141, the energy is returned to the primary side 141 through the back-connected first diode 122 of the first FET 121. At this time, it is all about discharging the magnetizing inductance. It is to be noted that, by properly adjusting the rate of turns between the primary side 141 and the secondary side 142, it is possible to make significant change to the load of the second FET 171, so as to change the voltage output to the secondary battery 200.

Figure 5:
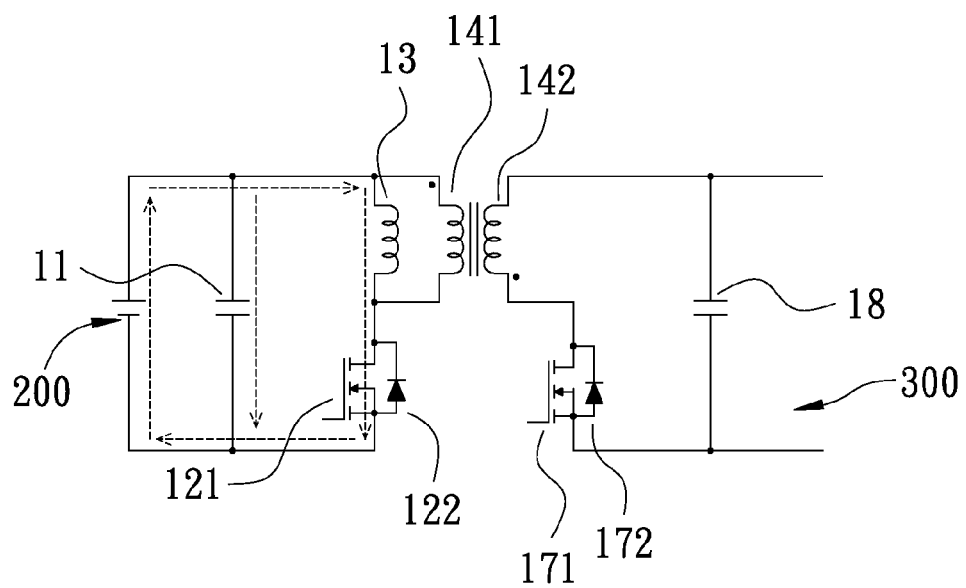
FIG. 5 schematically shows a first discharging state of the first embodiment of the present invention.
Figure 6:
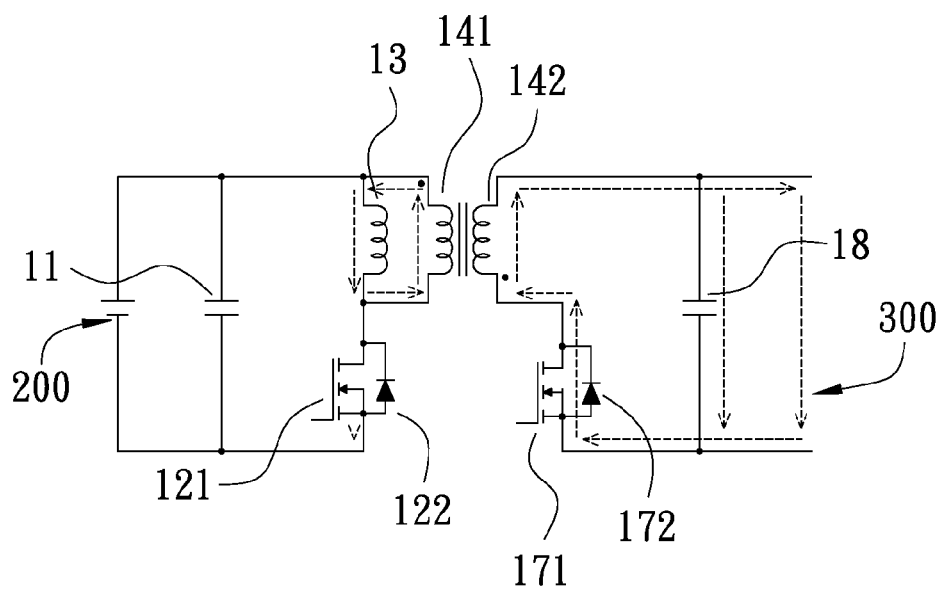
FIG. 6 schematically shows a second discharging state of the first embodiment of the present invention.

Referring to FIG. 5 that schematically shows a first discharging state of the first embodiment of the present invention together with FIG. 2, when the flyback controller operates in the discharging mode, the digital-signal processor 20 first sends out a driving signal to turn the first FET 121 on and turn the second FET 171 off. At this time, electric current flows through the first FET 121, and magnetizes the first inductor 13 for storing energy. Referring to FIG. 6 that schematically shows a second discharging state of the first embodiment of the present invention together with FIG. 2, the digital-signal processor 20 turns the first FET 121 off, so that both the first FET 121 and the second FET 171 are off. At this time, the electric current at the first inductor 13 has the energy transferred to the secondary side 142 through the primary side 141. After transferred to the secondary side 142, the energy is returned to the secondary side 142 through the back-connected second diode 172 of the second FET 171. Then the digital-signal processor 20 turns the second FET 171 on, and turns the first FET 121 off. At this time, the electric current at the first inductor 13 has the energy transferred to the secondary side 142 through the primary side 141. After transferred to the secondary side 142, the energy is returned to the secondary side 142 through the second FET 171. The digital-signal processor 20 then turns the second FET 171 off, so that both the first FET 121 and the second FET 171 are off. At this time, the electric current at the first inductor 13 has the energy transferred to the secondary side 142 through the primary side 141. After transferred to the secondary side 142, the energy is returned to the secondary side 142 through the back-connected second diode 172 of the second FET 171. At this time, it is all about discharging the magnetizing inductance.

By testing the flyback controller in the charging mode and the discharging mode, it is demonstrated that the flyback controller is more efficient than a bidirectional DC-DC converter based on phase-shifted full-bridge topology.

It is to be noted that the bidirectional DC-DC converters 10 of the flyback controller contain the first RCD snubber 15 and the second RCD snubber 19, so as to effectively reduce voltage surges on the power transistors and eliminated related problems.

Moreover, the flyback controller uses the first control loop 201 and the second control loop 202 to control the bidirectional DC-DC converters 101, 102 in the charging mode and in the discharging mode, respectively, so as to even the electric current.

The flyback controller is composed of current-sensing devices of high accuracy and PWMs of high definition. Therefore, in command tracing tests for small, step current that use current modulation of the secondary battery 200, the flyback controller shows good low-current response. In the tests of charging and discharging the secondary battery 200 with low current, the flyback controller shows good properties in terms of command tracing and zero crossing.

Figure 7:
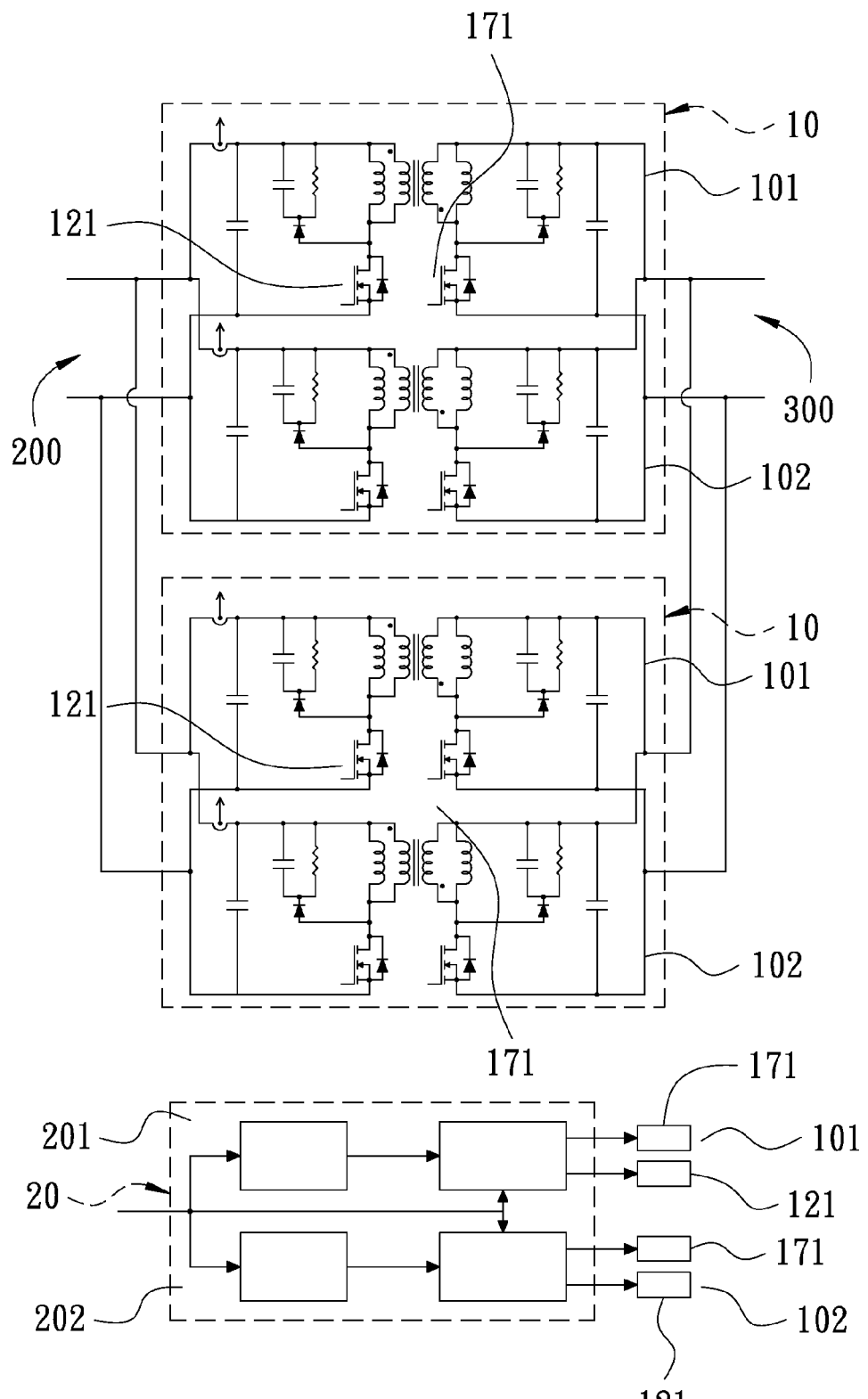
FIG. 7 schematically shows a second embodiment of the present invention.

FIG. 7 schematically shows a second embodiment of the present invention. The second embodiment is different from the first embodiment as it comprises two first bidirectional DC-DC converters 101 and two second bidirectional DC-DC converters 102. The first bidirectional DC-DC converters 101 are connected in parallel with the second bidirectional DC-DC converters 102, respectively. Each set of the parallelly-connected first and second bidirectional DC-DC converters 101, 102 is further connected in parallel with the other set, so that the flyback controller has parallelly-connected power modules for increased power output.

The features and expected effects of the present invention are summarized below:

1. The disclosed flyback controller is constructed from a flyback controller that uses limited power devices, and implements a digital-signal processor as its control core. The resultant DC-DC converter system provides insulated and bidirectional energy flow and transformation with simplified structure. Besides, with the parallelly-connected two power modules, the power output is large enough to meet the requirements for tests on secondary batteries.

2. The disclosed flyback controller can have two power modules connected in parallel to increase its power output and reduce current ripples on the magnetizing inductance.

3. The disclosed flyback controller uses current-sensing devices of high accuracy and PWMs of high definition to perform low-current control and address problems such as trapezoidal command transition for charging and discharging secondary batteries and poor response at zero crossing.

What is claimed is:

1. A flyback controller featuring bidirectional power control and parallelly-connected power modules, the flyback controller comprising:
    a first bidirectional DC-DC converter comprising a first capacitor, the first capacitor being connected in series with a first FET, the first FET being connected in parallel with a first diode, the first FET and the first diode being further connected in series with a first inductor, the first inductor being connected in parallel with a primary side of a high-frequency transformer, the first inductor being connected in series with the first capacitor, the high-frequency transformer having a secondary side connected in parallel with a second inductor, the second inductor being connected in series with a second FET, the second FET being connected in parallel with a second diode, the second FET and the second diode being further connected in series with a second capacitor, and the second capacitor being connected in series with the second inductor; and
    a second bidirectional DC-DC converter being connected in parallel with the first bidirectional DC-DC converter, the second bidirectional DC-DC converter comprising a first capacitor, the first capacitor being connected in series with a first FET, the first FET being connected in parallel with a first diode, the first FET and the first diode being further connected in series with a first inductor, the first inductor being connected in parallel with a primary side of a high-frequency transformer, the first inductor being further connected in series with the first capacitor, the high-frequency transformer having a secondary side connected in parallel with a second inductor, the second inductor being connected in series with a second FET, the second FET being connected in parallel with a second diode, the second FET and the second diode being further connected in series with a second capacitor, and the second capacitor being further connected in series with the second inductor;

whereby, the parallelly connected first and second bidirectional DC-DC converters amplifies an output power, and the second FET together with the second diode makes a current flow form the secondary side of the high-frequency transformer toward the primary side of the high-frequency transformer, so that the first bidirectional DC-DC converter and the second bidirectional DC-DC converter achieve bidirectional power flow.

2. The flyback controller of claim 1, further comprising a digital-signal processor that is electrically connected with the first bidirectional DC-DC converter and the second bidirectional DC-DC converter separately, and serves to make the current flow evenly across the first bidirectional DC-DC converter and the second bidirectional DC-DC converter.

3. The flyback controller of claim 1, wherein the first inductor is connected in parallel with a first RCD snubber, and the second inductor is connected in parallel with a second RCD snubber.

4. The flyback controller of claim 2, wherein the digital-signal processor comprises a first control loop and a second control loop, the first control loop having one end electrically connected with the first capacitor of the first bidirectional DC-DC converter, the first control loop comprising a first current controller, the first current controller being connected in series with a first pulse width modulator, the first pulse width modulator being electrically connected with the first FET and the second FET of the first bidirectional DC-DC converter separately, the second control loop having one end electrically connected with the first capacitor of the second bidirectional DC-DC converter, the second control loop comprising a second current controller, the second current controller being connected in series with a second pulse width modulator, the second pulse width modulator electrically connected with the first FET and the second FET of the second bidirectional DC-DC converter separately.

5. The flyback controller of claim 3, wherein the first RCD snubber comprises a diode that is connected in series with a capacitor that is further connected in parallel with a resister, and the second RCD snubber comprises a diode that is connected in series with a capacitor that is further connected in parallel with a resister.

6. A flyback controller featuring bidirectional power control and parallelly-connected power modules, comprising:
    a plurality of said first bidirectional DC-DC converters of claim 1, which are connected in parallel with each other;
    a plurality of said second bidirectional DC-DC converters of claim 1, which are connected in parallel with the first bidirectional DC-DC converters respectively.

* * * * *